United States Patent [19]
Andrews et al.

[11] Patent Number: 6,065,131
[45] Date of Patent: May 16, 2000

[54] MULTI-SPEED DSP KERNEL AND CLOCK MECHANISM

[75] Inventors: Lawrence P. Andrews; Richard C. Beckman; Joseph C. Petty, Jr., all of Boca Raton; John C. Sinibaldi, Pompano Beach, all of Fla.

[73] Assignee: International Business Machines Corporation, Armonk, N.Y.

[21] Appl. No.: 08/979,530

[22] Filed: Nov. 26, 1997

[51] Int. Cl.[7] .................................... G06F 1/08
[52] U.S. Cl. .................... 713/600; 713/501; 712/42; 712/220
[58] Field of Search .............. 395/800.16, 200.44, 395/672, 559; 711/15; 364/270; 713/600, 601, 501; 712/42, 200, 220, 226, 229, 245, 1

[56] References Cited

U.S. PATENT DOCUMENTS

| | | | |
|---|---|---|---|
| 3,656,123 | 4/1972 | Carnevale et al. | 395/559 |
| 4,136,383 | 1/1979 | Takesue | 395/562 |
| 5,260,978 | 11/1993 | Fleischer et al. | 375/354 |
| 5,325,516 | 6/1994 | Blomgren et al. | 711/15 |
| 5,349,656 | 9/1994 | Kaneko et al. | 395/672 |
| 5,436,734 | 7/1995 | Yamauchi et al. | 358/448 |
| 5,459,720 | 10/1995 | Iliev et al. | 370/393 |
| 5,537,581 | 7/1996 | Conary et al. | 364/270 |
| 5,581,778 | 12/1996 | Chin et al. | 395/800.16 |
| 5,588,152 | 12/1996 | Dapp et al. | 395/800.16 |
| 5,625,836 | 4/1997 | Barker et al. | 395/200.44 |
| 5,637,841 | 6/1997 | Dugan et al. | 187/294 |
| 5,809,336 | 9/1998 | Moore et al. | 710/25 |

OTHER PUBLICATIONS

*IBM Technical Disclosure Bulletin*, Real–Time Operating System for Digital Processors, vol. 36, No. 09A, Sep. 1993, pp. 71–73.

*IBM Technical Disclosure Bulletin*, Simulation Method for Delay Distributions in Discrete–Event Stochastic Systems, vol. 39, No. 11, Nov. 1996, pp. 127–130.

*Primary Examiner*—Richard L. Ellis
*Attorney, Agent, or Firm*—Richard A. Tomlin; Ronald V. Davidge

[57] ABSTRACT

The processing speed of a digital signal processor or system processor is controlled in accordance with the functions required in a task to be performed by the device, with these functions being compared to a table of maximum processing speeds at which various functions can be performed reliably by the device. This method is applied to a number of digital signal processors on a communications adapter, with a core kernel of each of these digital signal processors being driven at a processing speed controlled in this way, while peripheral functions of all these digital signal processors are performed according to a clock signal synchronized with data being received from a network transmission line.

8 Claims, 5 Drawing Sheets

MULTI-SPEED DSP KERNEL AND CLOCK MECHANISM

CROSS-REFERENCE TO RELATED APPLICATIONS

This application is related to a U.S. application, Ser. No. 08/944,209 now U.S. Pat. No. 5,968,158, filed Oct. 6, 1997, entitled "Apparatus Including a Host Processor and Communications Adapters Interconnected with a Bus, with Improved Transfer of Interrupts between the Adapters and the Host Processor" (as amended), for which the Issue Fee has been paid, having a common assignee with the present invention, the disclosure of which is incorporated herein by reference. This co-pending application describes a pair of communications adapters, which each include a number of digital signal processors and network interface circuits for the attachment of a multi-channel telephone line. A bus connecting the communications adapters can carry data between a network line attached to one of the adapters and the digital signal processors of the other adapter. The digital signal processors on each card are connected to a host, or controller, processor. Each digital signal processor interrupts its host processor by transmitting an interrupt control block as data to a data memory of the host processor, and by subsequently sending an interrupt causing the host processor to examine the data memory. Preferably, the interrupt control block includes data representing a number of requested interrupts.

This application is also related to a co-pending U.S. application, Ser. No. 08/951,842, filed Oct. 16, 1997, entitled "Intelligent Router for Internet Access," having a common assignee with the present invention, the disclosure of which is incorporated herein by reference. This co-pending application describes a remote network server including primary and secondary routers, each of which include means for emulating a number of different modem types and for operating in accordance with a number of different communication protocols. Incoming calls are directed at the primary router, but are routed through the secondary router if either the type of modem making a call cannot be emulated in the primary router or if the primary router cannot operate with the protocol used by this calling modem.

This application is also related to a co-pending U.S. application, Ser. No. 08/979,531 entitled "Communications Adapter for Processing ATM and ISDN Data," having a common assignee with the present invention, the disclosure of which is incorporated herein by reference. This co-pending application describes a communications adapter to which two T1 or E1 transmission lines are connected, with the communications adapter having a capability of handling ISDN data from both the transmission lines, ATM data from both the transmission lines, or ISDN data from one of the transmission lines and ATM data from the other.

BACKGROUND OF THE INVENTION

1. Field of the Invention

This invention relates to running a digital signal processor (DSP) at various processing speeds and, more particularly, to determining such processing speeds in accordance with the complexity of tasks to be performed and the capabilities of the particular DSP.

2. Background Information

The processing speed, or MIP rate (million instructions per second) of a DSP is classically chosen according to the access speed of associated memory. However, increases in the circuit density of DSPs has left certain of these devices vulnerable to various other types of functional problems related to their processing speeds. For example, the multiplier function of a particular DSP may work only intermittently at a certain processing speed but reliably at a lower processing speed, with other functions working reliably at both these processing speeds. Such a DSP may be used in an application in which the multiplying function is not addressed, allowing reliable operation at the higher processing speed, or it may be required to run a task requiring use of the multiplying function, so that reliable operation can only be achieved at the lower speed.

DSP chips have been conventionally sorted according to their process speed capability. However, what is needed is a means for establishing a processing speed based both on the capability of an individual chip and on the task to be performed.

One application of DSPs which is particularly sensitive to a need for flexibility in processing speed is that of a DSP-based, time division multiplexing communications adapter connecting a computing system or Internet server to an ISDN transmission line. In such an adapter, DSPs are used for various signal processing operations and for modem emulation. In this environment, an individual DSP may be operating at a relatively slow speed to receive and transmit data on the transmission line, or at a higher speed to process signals, with some signal processing tasks requiring complex functions, such as multiplication.

3. Description of the Prior Art

U.S. Pat. No. 5,260,978 describes a method and apparatus for use with a processor having an ability to operate at different speeds within a predetermined range in response to a recovered timing signal from an ATM telecommunications network.

From *The IBM Technical Disclosure Bulletin*, Vol. 36, No. 09A, September, 1993, pp. 71–73, an article entitled "Real-Time Operating System for Digital Processors" outlines an operating system for DSPs that provides an efficient multi-tasking hard real-time environment for concurrent execution of multiple programmable signal processing tasks. Tasks can be dynamically reconfigured without stopping, reducing scheduling overhead for a minor processing overhead. In order to maintain synchrony among a cluster of tasks that are associated with different information sources, having asynchronous information rates, the real-time operating system architecture defines a global real-time clock used for such synchronization.

While these prior art references deal with synchronizing clock speeds and signals in response to varying conditions occurring with differing types of data transmission, a method for dealing with the performance factors determining the process speed at which an individual DSP can be reliably operated is not anticipated. What is needed is a method for determining the process speed in response to the process requirements of particular tasks to be executed and the capability of the individual DSP.

SUMMARY OF THE INVENTION

It is therefor an objective of the present invention to provide a method for operating a DSP at a process speed determined in accordance with the functions required by a task being performed and with in accordance with the previously-measured ability of the particular DSP to perform these functions.

It is another objective of the present invention to provide a communications adapter having a number of DSPs, each of which has a kernel operating at a process speed determined in accordance with the functions required by a task being performed and with in accordance with the previously-measured ability of the particular DSP to perform these functions, while peripheral functions are performed through the use of interrupts at a speed synchronized with an incoming data transmission.

According to a first aspect of the invention, there is provided a method for controlling the processing rate of a processor within a computing device, wherein the method comprises steps of:

a) executing a test sequence to determine, for each function which can be performed by the processor, a maximum processing speed, within a plurality of processing speeds at which the processor can be operated, at which the function can be reliably performed by the processor, and writing the maximum processing speed within a processing speed table;

b) determining for a task scheduled to be performed by the processor, the functions to be performed by the processor, and by comparison to the processing speed table, a maximum operating speed at which all the functions to be performed during the task may be performed reliably thereby;

c) performing the task at the maximum operating speed; and d) returning to step b) when another task is scheduled to be performed by the processor.

In accordance with another aspect of the invention, there is provided a computing system including a connector for attachment of a network transmission line, a plurality of digital signal processors, a peripheral clock signal circuit, a memory, means for determining, for a task to be performed by a digital signal processor, which functions are required, and a core clock signal circuit. The digital signal processors are arranged to process data received from the network transmission line and to process data for transmission along the network transmission line. The peripheral clock signal circuit generates signals used within the digital signal processors to time peripheral functions thereof with the transmission of interrupts. The peripheral clock circuit is driven in response to signals received from the network transmission line. The memory stores a processing speed table for each digital signal processor. The processing speed table has indices representing maximum processing speeds at which the digital signal processor can reliably perform a number of functions. Each index is associated in the processing speed table with a function. The core clock signal circuit operates at a maximum reliable operating speed determined from the functions which are required to a task to be performed and the process speed for the digital signal processor.

DETAILED DESCRIPTION

Figure 1:
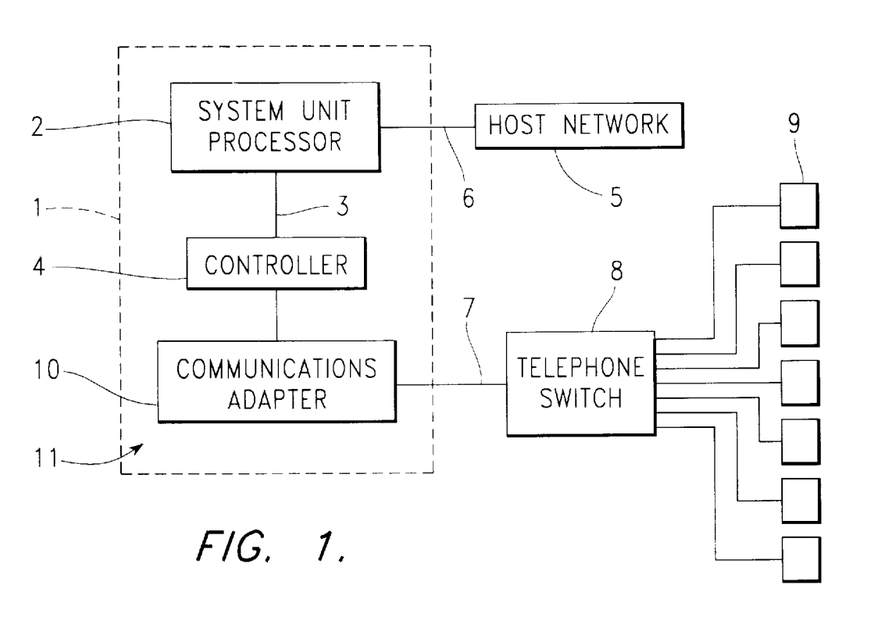
FIG. 1 is a schematic view of an ISDN server application using a communications adapter with DSP clocking circuits built in accordance with the present invention.

FIG. 1 is a schematic view of an ISDN server application using a communications adapter with DSP clocking circuits built according to the present invention. In this application, a computer system 1 includes a system unit processor 2 having a PCI (Peripheral Component Interconnect) bus 3 extending to a controller 4. Data is transferred between a host network 5, such as a database service network, and the computer system 1 over a LAN 6 (Local Area Network). Also connected to the computer system 1 is an ISDN network line 7, which extends through the public switched telephone network to a switch 8, which is part of this telephone network. The ISDN network line 7 is, for example a T1 line in the United States or an E1 line in Europe. At the switch 8, signals from the ISDN network line 7 are divided among a number of devices 9, which may be telephones, computing devices, or combinations thereof.

In the computing system 1, the ISDN line 7 is connected to a communications adapter card 10. A single ISDN subsystem 11 consists of a single card pair, with a communications adapter card 10 plugged into a controller card 4, providing modem or other TDM voice-related functions within an ISDN primary rate interface for a personal computer having a PCI bus. Such a single card pair subsystem 11 can handle 30 ISDN B channels, making use of the full ISDN B channel bandwidth of 64 Kbps (killobits) per second while communicating with remote digital devices. Alternatively, a single card pair subsystem 11 can provide for 15 connections to remote analog modems at data rates up to 56 Kbps when communicating with remote analog modems. The actual number of channels which can be connected in this way may vary somewhat from these numbers, depending on the characteristics and limitations of the public switched telephone network as well as on the capabilities of the ISDN subsystem 11. The computing system 1 may be, for example, an IBM 7588 industrial computer, having a PCI bus 3 which can be connected to multiple ISDN subsystems 11, each of which is connected through an ISDN network 7 to a separate ISDN network. The adapter card 10 may be used to process data signals, voice signals requiring speech synthesis or speech recognition, or video signals in a videoconferencing application.

Figure 2:
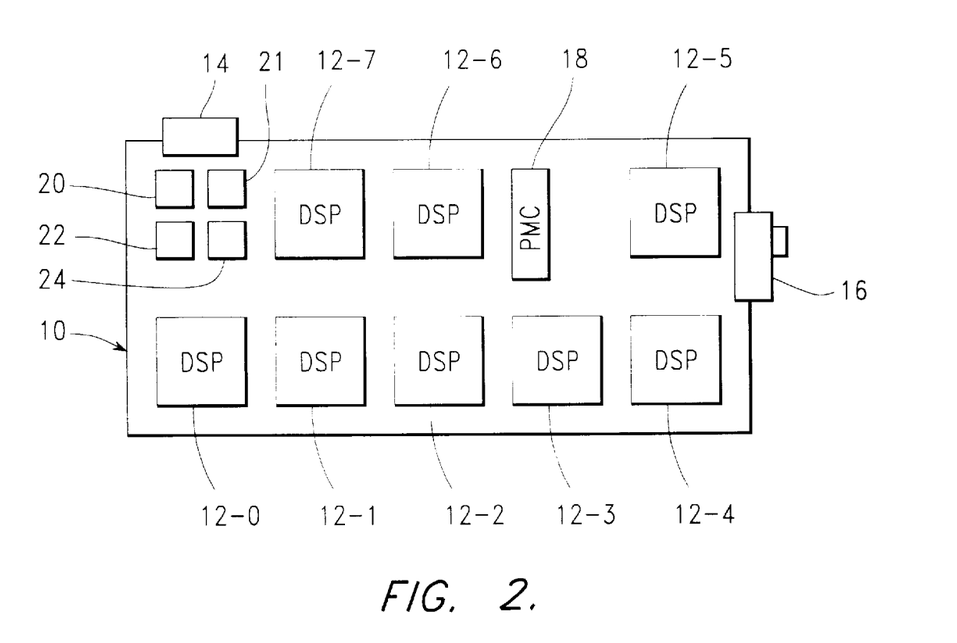
FIG. 2 is a diagrammatic view of the communications adapter card of FIG. 1.

FIG. 2 is a diagrammatic view of a communications adapter card 10 built in accordance with the present invention. This card 10 includes eight digital signal processor (DSP) subsystems 12-0 through 12-7, together with provisions for bus connections through an SC-bus connector 14, an E1/T1 interface connector 16, to which the ISDN network line 7 (shown in FIG. 1) is connected, and a PMC (PCI Mezzanine Card) PCI connector 18, by which the communications card 10 is connected as a daughter card to the controller card 4 (also shown in FIG. 1). Other major components are an SC-bus switch 20, supporting an SC-bus interface, configured according to SCSA (Signal Computing System Architecture) requirements, through the SC-bus connector 14, a serial to parallel interface 21, and a network interface including a frame aligner 22 and a driver/receiver 24.

The performance of the communications adapter 10 is in part dependent on the processing speed (or MIP rate) of the DSP subsystems 12. However, the rate at which reliable operation can occur may be limited by the complexity of the tasks being performed, with, for example, tasks requiring the multiplier or barrel shifter functions limiting the processing speed of operation of these DSP subsystems. In this application, the tasks placed on these DSP subsystems are quite varied, with various types of modems to be emulated, and with other signal processing functions to be performed. Thus, the DSP subsystems 12 may be called upon to perform computationally intensive transformation algorithms. Among various individual DSP subsystems 12, variations may also occur in the maximum rate at which certain complex operations can be performed reliably.

Figure 3:
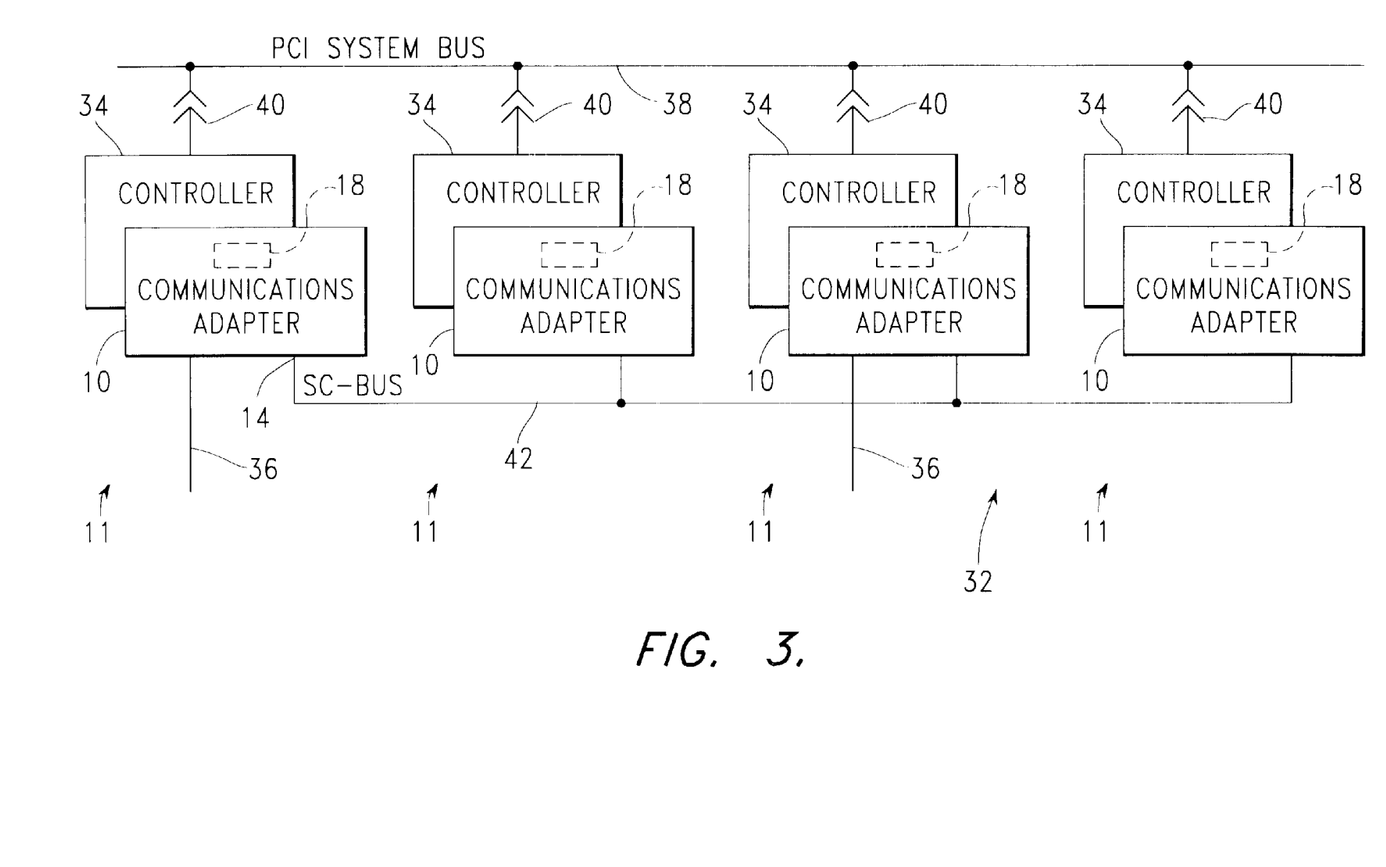
FIG. 3 is a schematic view of a communications configuration including four of the communications adapter cards of FIG. 2.

FIG. 3 is a schematic view of a communications configuration 32, built in accordance with the present invention, in which four of the communications adapter cards 10 of FIG. 2 are individually connected to four associated controller cards 4. This configuration supports two ISDN modem interfaces 36. The controller card 4 is, for example, an IBM PCI-960 Base Controller. Each controller card 4 fits into a card slot of a personal computer supporting a PCI bus 38, which is provided through a connection 40. A PCI bus connection is also made between each controller card 4 and its associated communications adapter card 10 through a PMC PCI connector 18. The communications adapter cards 10 are also interconnected through an SC-bus 42, extending through a ribbon cable atop the cards 10, 4, to be connected through SC-bus connectors 14. In the example of FIG. 3, two adjacent ISDN subsystems are linked to handle 60 ISDN B channels, 30 connections to remote analog modems, or various combinations thereof. In FIG. 2, two such linked pairs of ISDN subsystems are shown, each of which has a single connection to an E1 or T1 line 7.

Referring to FIGS. 2 and 3, the eight DSP subsystems 12 on each communications adapter card 10 provide modem functions from 300 bps (bits per second) to 56 Kbps for each of fifteen ISDN B channels within the ISDN interface 36. Two card-pair subsystems 11 are thus needed for 30 ISDN B channels. Each DSP subsystem 12 provides modem data pumping and protocol processing functions for two analog modem channels, or data and voice processing functions for up to four ISDN digital channels. All eight DSP subsystems 12 on the card 10 share a common TDM port, dropping and inserting their data at their assigned time slots.

Thus, in the configuration of FIG. 3, twice as many card-pair subsystems 11 are required for the attachment of a single ISDN network line 36, as in the configuration of FIG. 1. However, in the configuration of FIG. 3, twice as much processing resources are available for each ISDN network line 36 as for the lines 7 of FIG. 1. This additional processing capability may be used to service additional remote devices or terminals, or to process more complex algorithms for each channel. Again, the actual number of devices which can be connected depends on the capabilities of the telephone network as well as on the capabilities of the subsystems 11.

Figure 4:
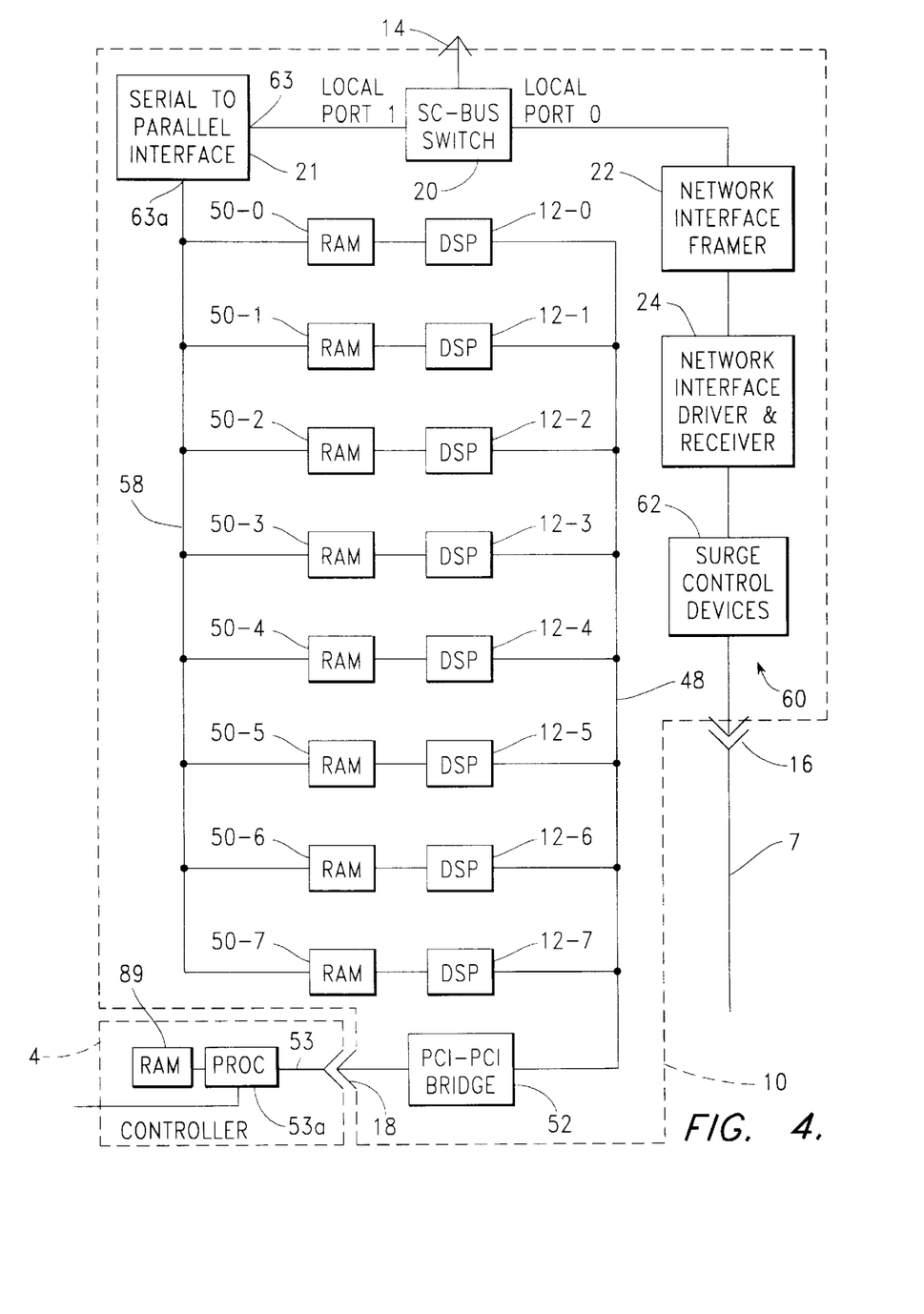
FIG. 4 is a functional block diagram of the communications adapter card of FIG. 2, particularly showing the routes of data flow.

FIG. 4 is a functional block diagram of the communications adapter card 10 of FIG. 2, particularly showing the routes of data flow. Each DSP subsystem 12 is connected to a PCI bus 48 extending along the card 10, and to a two-port data RAM 50 which is provided as a transmit/receive buffer for the corresponding DSP subsystem 12. Each 2-port data RAM 50 is a 1K×8 high-speed static RAM device, such as a Cypress CY7C131 memory module. The PCI bus 48 is connected through a PCI—PCI bridge circuit 52 to a bus 53 extending through the PCM PCI connector 18 into the controller card 4. The PCI bus 48 is a synchronous 32-bit I/O interface running at 33 Mhz. Interrupts A and B, as defined by the PCI local bus architecture, are used, with the DSP subsystem 12-0 connected to interrupt line A, while the DSP subsystems 12-1 through 12-7 are tied together on interrupt line B. All interrupt functions between these DSP subsystems 12 and the controller card 4 are controlled by a processor 53a of the controller card 4, which is, for example, an Intel 80960 processor.

The PCI—PCI bridge circuit 52 electrically isolates the PCI bus 48 from the PCI bus 53 and provides arbitration for the eight DSP subsystems 12 as they request busmaster service. This bridge circuit 52, may each be, for example, a DEC 21150 PCI—PCI Bridge chip, which can handle up to nine devices. The bridge circuit 52 includes a memory space which is divided into standard bridge configuration registers and device-specific configuration registers. The device-specific registers, which are not needed for standard implementations between PCI busses, are not programmed for this application. The standard configuration registers are controlled by the kernel of the controller card processor 53a.

The 2-port data RAM devices 50 are individually connected through an 8-bit data channel 58 to a serial to parallel TDM interface chip 21, which may be, for example, a Mitel MT8920B interface chip. This interface chip 21 is in turn connected to LOCAL PORT 1 of SC-bus switch 20, which may be, for example, a VLSI SC4000 interface chip. This bus switch 20 is in turn connected to the SC-bus connector 14.

The E1 or T1 line 7 is attached to the communications adapter card 10 through the network interface connector 16. Lines from this connector 16 are routed through a network interface including surge control devices 62, network interface driver and receiver 24, and network framer 22. The network interface driver and receiver 24 is, for example, a Siemens PRACT (Primary Rate Access Clock and Transceiver) PEB 22320 chip. The network framer chip 22, is, for example, be a Siemens ACFA (Advanced CMOS Frame Aligner) PEB 2035 chip. The network interface driver and receiver 24 generates the primary clock interface for all of the TDM hardware modules, such as network framer chip 22, the serial to parallel interface 21, and the SC-bus switch 20. The network interface driver and receiver 24 and the network framer chip 22 are controlled by DSP subsystem 12-0, in a manner which will be described in reference to FIG. 5. The network interface circuit 60 also includes transformers for receive and transmit circuits, termination resistors, and diode clamps. While changes in programming can cause the communications adapter 10 to operate in alternate modes as required by attachment to an E1 or T1 line, changes in a hardware configuration of network impedance matching resistors are also required between these modes. Serial transmit and receive lines from the network interface circuit 60 are connected to LOCAL PORT 0 of the SC-bus switch 20.

The communication adapter card 10 supports an SCSA (Signal Computing Systems Architecture) interface at its top edge along a 26-pin connector 14. This interface supplies all of the necessary clocking signals, and sixteen serial data signals for card-to-card communications. This interface has the capability of eight full-duplex T1 or E1 network lines. Additionally, the number of timeslots per frame is programmable to 32 or 64. Preferably, this parameter is programmed to 32 timeslots per frame.

The SC-bus switch 20 supports four local serial port connections, of which only LOCAL PORT 0 and LOCAL PORT 1 are used. The switching function is implemented through two RAM memories, with a destination routing memory controlling data movement from the local ports to the SC-bus 42 (shown in FIG. 3), while a source routing memory controls data movement from the SC-bus 42 to the local ports. The timeslot number serves as the address to either routing memory, while the data stored in the routing memory becomes the switched timeslot number. Actual timeslot serial data is loaded in frame buffers and routed through multiplexing circuits controlled by the destination and source routing memories. There is a one-frame delay for data traveling through the SC-bus switch 20 in either direction.

The SC-bus switch 20 is the main clock source for all TDM clock functions, receiving a reference clock from the network interface driver and receiver module 24, which is synchronized to an incoming data stream received from the network transmission line 7. From this reference clock, the SC-bus switch 20 generates all main SC-bus clocks and all of the local port clocks. The local ports have a 4.096-Mhz bit clock and an 8-Khz frame synch clock, which are supplied to the network interface framer 22 and to the serial to parallel interface 21. When several communications adapter cards 10 are connected by the SC-bus 42, as shown in the example of FIG. 3, the SC-bus switch 20 of one of the cards 10 is programmed to be the master clock source, while the switches 20 on the other cards 10 are programmed to operate as slaves. In this way, the TDM data paths on all the cards 10 are synchronized to a single network cable 7. If this single clock source should fail, the SC-bus switches 20 have an ability to switch to another such switch 20 as an alternative master clock source, supporting a soft recovery mode of operation.

The serial to parallel interface chip 21 provides the connection between LOCAL PORT 1 of the SC-bus switch 20 and one port of each of the eight two-port 1K×8 RAM buffers 50. Serial transmit and receive data between the serial to parallel interface chip 21 and the SC-bus 20 is clocked at an E1 line speed of 2.048 Mbits per frame and 8000 frames per second. Data is shifted into one buffer 50 and out of another buffer 50 in full duplex mode. Separate transmit and receive 2-port RAM buffers (not shown) within the serial to parallel interface chip 21 each have one port tied to a separate serial port 63, while the other port of both these buffers is tied to a common parallel port 63a. One byte of transmit data is read from the transmit buffer RAM one channel time before it is shifted out the serial port 63 of this chip 21, and one byte of receive data is written to the receive buffer RAM one channel time after it is shifted in from the serial port 63. The parallel bus 58 extending between the parallel interface chip 21 and the RAM buffers 50 provides an 8-bit data bus and a 5-bit address bus, a WRITE ENABLE pulse, and a READ ENABLE pulse. This interface allows direct connection of the eight RAM buffers 50, being timed to read one byte and write one byte of parallel data as the serial interface from the serial to parallel interface chip 21 is shifting four bits in or out.

The parallel interface port 63a writes all 32 channels of receive data for every frame into all eight two-port RAM buffers 50 simultaneously. In this way, all eight DSP subsystems 12 have access to all received data. On the other hand, parallel transmit data is read from the transmit portion of a single two-port RAM buffer 50 at a time into the parallel interface port 63a.

Each 2-port static RAM buffer 50, being divided into transmit and receive buffers (not shown), stores eight consecutive frames of data to be transmitted or received. All 32 channels for each frame are allocated for both transmit and receive buffers. Each DSP subsystem 12 can access 256 bytes of receive buffer data and 256 bytes of transmit buffer data. The serial to parallel interface 21 requires a dedicated port to each of these buffers continuously. A 3-bit frame counter function is implemented in circuits associated with the DSP subsystem 12-0, which will be discussed in reference to FIG. 5. These three bits, together with the five address bits driven along bus 58 from the serial to parallel interface 21, provide for the selection which must be made among the transmit and receive buffers within the RAM buffers 50. The serial to parallel interface 21 can only read from the transmit buffers within the RAM buffers 50 and can only write to the receive buffers therein. All eight receive buffers are written simultaneously, but only one transmit buffer is read at a time.

The other, opposite port of each two-port RAM buffer 50 is dedicated to an associated DSP subsystem 12, which can only write to the transmit buffer within the RAM buffer 50 and read from the receive buffer therein.

Thus, referring to FIGS. 3 and 4, data received from the transmission line 7 moves as serial data from the network interface connector 16, through network interface devices 24, 22 into the LOCAL PORT 0 of SC-bus switch 20 and outward from the LOCAL PORT 1 of this switch 20 to the serial to parallel interface 21, where it is converted into a parallel format, in which it is carried into the RAM buffers 50. Data from these buffers 50 then flows through the associated DSP subsystems 12 to the internal PCI bus 48, and into the controller 4 through PCI bus 53. Alternately, the data received through the LOCAL PORT 0 in the SC-bus switch 20 is switched to be transmitted through the connector 14 and the SC-bus 42, to be processed through another communications controller 10 in the computing system.

Data to be transmitted on the transmission line 7 flows into the communications adapter 10 through PCI bus 53 and through PCI bus 48 to the DSP subsystems 12. This data is then written into the associated RAM buffers 50, to be sent therefrom, in a parallel format, along the 8-bit data bus 58, to the serial to parallel interface 21. In this interface 21, the data is converted to a serial format, to be directed through SC-bus 42 into the network interface devices 22, 24. This data is then driven into the network line 7 through interface connector 16. Alternatively, the SC-bus switch 20 can direct data received through LOCAL PORT 1 from the serial to parallel interface 21 outward through the SC-bus connector 14 to the SC-bus 42, to be transmitted from a network line 7 connected to another communications adapter 10.

Figure 5:
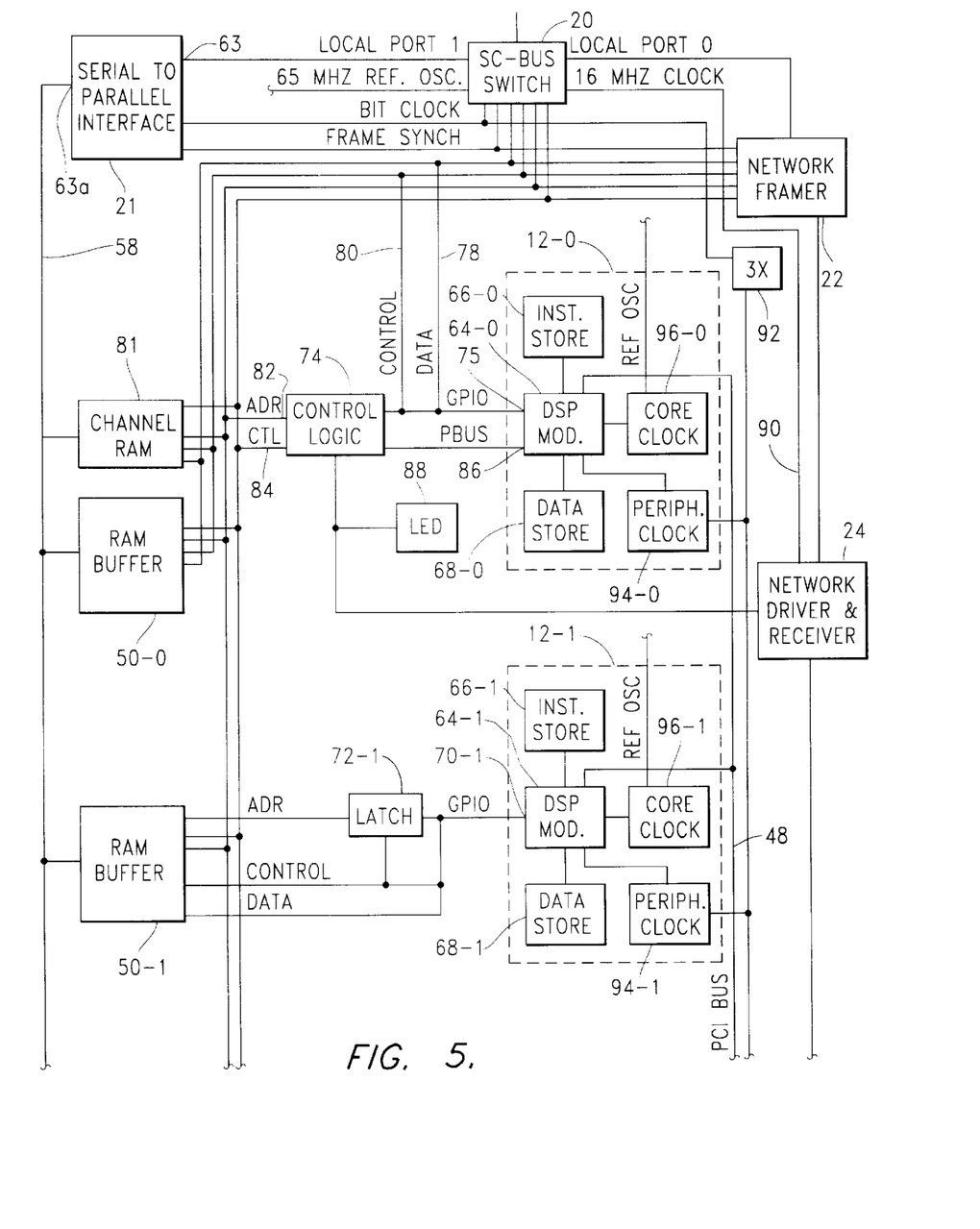
FIG. 5 is a block diagram of two DSP subsystems in the communications adapter card of FIG. 2, together with associated circuits.

FIG. 5 is a block diagram of DSP subsystems 12-0, 12-1 and associated circuits. This diagram also applies to six other DSP subsystems 12-2 through 12-7, which are identical to subsystem 12-1. The DSP subsystem 12-1 includes a DSP module 64-1, which is, for example, an MWAVE 3780P module, 128K×24 instruction storage 66-1, and 128K×16 data storage 68-1. The DSP module 64-1 drives the static RAM buffer 50-1 with its 16-bit GPIO port 70-1 and with an external 8-bit address latch module 72-1. The control code executing in DSP module 64-1 can only write to the transmit buffer area in RAM buffer 50-1, and can only read from the receive buffer area in this buffer 50-1.

The sixteen bits of the GPIO port 70 of each DSP module 64 can be programmed to be input only, output only, or bi-directional. A single DSP instruction can change the polarity of output bits, read the current state of the 16 bits, or tri-state a set of bits. Since only a single function can be performed with each DSP instruction, it requires a series of instructions to perform a timed sequence controlling an external device. In the communications adapter card 10 (shown in FIG. 4) nine DSP instructions are required to read and write a single address in the two-port RAM buffer. Each DSP subsystems 12-1 through 12-7 only control two devices, the associated RAM buffer 50 and a frame counter (not shown). Thus, hardware for only these two devices is implemented in connection with these subsystems 12-1 through 12-7. However, the DSP code executed within these subsystems is identical to that of the DSP subsystem 12-0, which controls several additional devices. Each DSP subsystem 12 determines which devices to control by reading a subsystem ID value from its DSTORE memory space.

Again, the DSP subsystem 12-0 includes a DSP module 64-0, 128K×24 instruction storage 66-0, and 128K×16 data storage 68-0. The DSP subsystem 12-0 also has an associated static RAM buffer 50-0, but its control is handled through an external control logic module 74, which may be implemented, for example, using a PAL (Programmable Array Logic) chip from Advanced Micro Devices. The control logic module 74 also provides ADDRESS and CONTROL outputs through which the DSP subsystem 12-0 establishes read/write control of the SC-bus switch 20, and the network interface framer 22. The DSP module 64-0 uses its parallel, bi-directional GPIO port 75 as a data bus 78 and a control bus 80 to read and write to registers in the network framer 22, in the SC-bus switch 20, in a two-port channel RAM circuit 81, and in the two-port data RAM buffer 50-0. A read or write to a register within the network framer 22 requires a sequence of DSP instructions which manipulate the GPIO port 75 to match the required timings for an I/O cycle of the network framer 22. The GPIO port 75 also supports an interrupt function to monitor signalling and error status from the network framer 22. Address lines 82 and additional control lines 84 also extend to these circuits 20, 22, 81, and 50-0 from control logic module 74. The address lines 82 and control lines 80, 84 are also extended to two-port data RAM buffers 50-1 through 50-7, so that the DSP subsystem can control operation of these devices. To prevent read/write access conflicts, each DSP subsystem 12-0 through 12-7 can monitor the value of a common frame counter within control logic 74. Each DSP subsystem 12 uses this information to avoid writing in locations in both the transmit and receive buffers of its associated RAM buffer 50, when these buffers are being used by the serial to parallel interface 21.

Control of the network interface driver and receiver 24 is established through the PBUS port 86 of the DSP module 64-0. This port 86 acts as an 8-bit slave ISA interface, with only write commands being needed to set latches in the control logic 74. The PBUS port 86 is self-clocking, requiring only one DSP instruction to issue a write command to the driver and receiver module 24, which only accepts write command from the PBUS port 86. A yellow/green LED 88 is also controlled in this way, providing a viable indication of the use of the communications adapter card 10, at its end, which can be seen at the rear of the computer 1 (shown in FIG. 1).

The two-port channel RAM module 81 is a single 1K×8 device controlled only by DSP subsystem 12-0. Only 64 locations are used within this RAM module 81, forming a first 32-location buffer used by the serial to parallel interface 21 (shown in FIG. 4) and a second 32-location buffer used by the DSP subsystem 12-0. These two buffers are separated by an address bit controlled by a ping pong latch. Since the polarities of the two outputs of the ping pong latch are always opposite one another, both port addresses never simultaneously include the same value, preventing read/write conflicts from both ports to a common internal array. The DSP subsystem 12-0 controls the state of the ping pong latch. When the DSP subsystem 12-0 is using one buffer, the serial to parallel interface 21 is using the other. When the state of the ping pong latch is flipped, the buffers are reversed. This operation allows the DSP subsystem 12-0 to pre-load or modify channel or subsystem site information before turning over this new or updated buffer information to the series-to-parallel interface 21.

The MWAVE 3780P module contains an ISP-5.6 DSP core, operable at processing speeds up to 44 MIP, which can access 128K of 24-bit instructions and 128K of 16-bit data storage. This module is a multifunction device containing PCI functions for DSP, UART, MIDI, Soundblaster, Soundblaster DMA Controller, and three PBUS parallel devices. In the example of the present invention, only the DSP device is configured for the PCI interface. Only in the DSP module 64-0, the three PBUS devices are used by the DSP core, but not by the PCI interface. There are three additional serial I/O ports available from each MWAVE module, but they are left unconnected, as they are not used. All of these additional peripheral interfaces and unused device functions are disabled and powered down through peripheral control and power management registers to minimize power consumption and to avoid resource conflicts.

The various clocking signals used within the communications adapter 10 will now be discussed with continuing reference to FIG. 5. Each DSP module 64 includes internal logic for changing the core clock rate, or MIP rate, of the DSP module in relation to a reference oscillator. Each processor core is clocked separately from on-chip peripheral functions, such as TDM and I/O.

In accordance with a version of the present invention, means are provided allowing the DSP kernel of each DSP module to adjust its own core clock rate during operation of the module in order to maximize the processing power of the DSP complex 12 while maintaining reliable operation. Portions of the DSP code which access internal logic constrained by the clock rate can be reduced in real time. Additionally, the clock rates of portions of the DSP code that access external components with clock dependencies may be increased or decreased, so that the core clock rate of an individual DSP module 64 is optimized for a particular operation.

In a preferred embodiment of the communications adapter 10, clocking begins with a 16-Mhz clock generated within the network driver and receiver 24 extracted from the received network data stream. This clock signal is sent along a line 90 to the SC-bus switch 20. Next, the SC-bus switch 20 generates a 4.096-Mhz BIT CLOCK signal, and an 8-Khz FRAME SYNCH clock signal, both of which are used to drive the network framer 22, and the serial to parallel interface 21 in synchronization with the data stream. In a frequency multiplier 92, the frequency of the BIT CLOCK signal is multiplied by three to obtain a 12.288-Mhz clock signal used to synchronize interrupts developed within each DSP subsystem 12 with the data stream.

Each DSP subsystem 12 includes a peripheral clock generator 94 and a core clock generator 96. Each of these clock generators 94, 96 includes a PLL (Phase Locked Loop). The peripheral clock generator 94 provides a clocking signal for peripheral functions, being used particularly in timing the transmission of interrupts from the DSP subsystem 12. In particular, the peripheral clock generator 94 generates a 9.60-Khz clock signal and an 8.00-Khz clock signal for interrupts. Each core clock generator 96 is driven by a signal from a single external 33.8688-Mhz oscillator. The phase PLL circuit within this clock generator 94 is programmable to provide different clock speeds in accordance with the values stored in several clock speed controlling registers within the DSP subsystem. The clock signal frequency of the peripheral clock generator 94 is not changed in accordance with the values stored in these clock speed controlling registers. Each DSP subsystem 12 can write data into its own clock speed controlling registers, or such data may be written over the PCI bus 48 by, for example, the controller card processor 53a.

Figure 6:
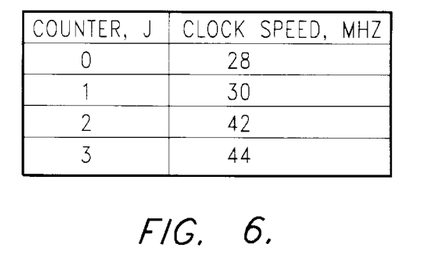
FIG. 6 is a table listing clock frequencies at which the core kernels of the DSP subsystems in the communications adapter card of FIG. 2 are operated.
Figures 8, 9:
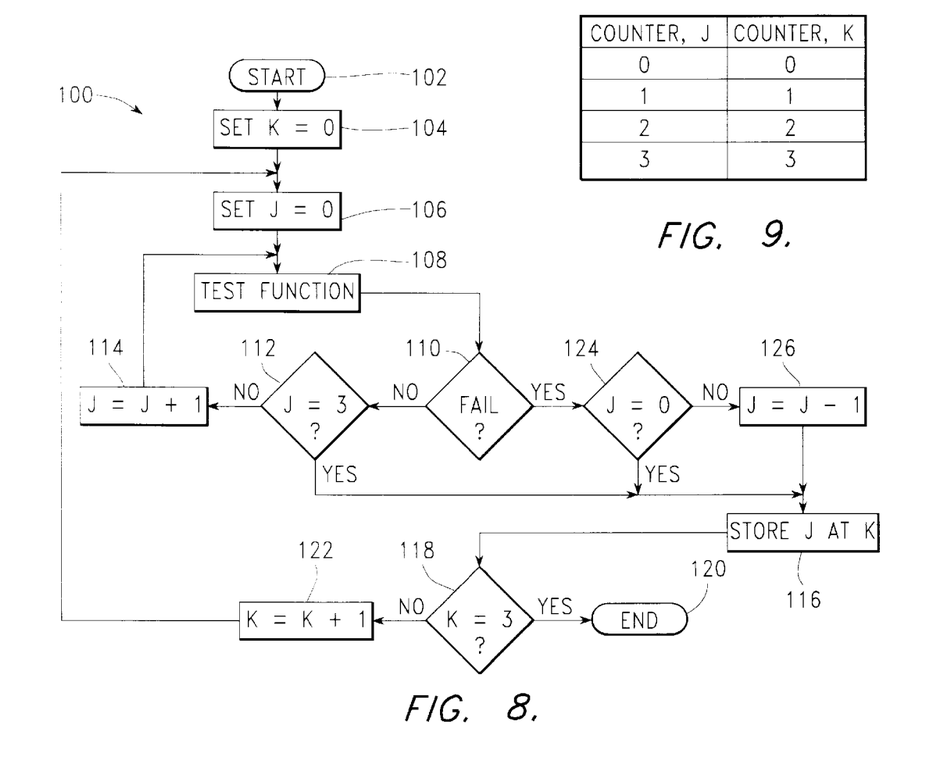
FIG. 8 is a flow chart of a routine determining, for an individual DSP subsystem in the communications adapter card of FIG. 2, which of the processing speeds of FIG. 6 can be used for each of the functions of FIG. 7.
FIG. 9 is a processing speed table showing a maximum process speed at which each of the DSP functions of FIG. 7 can be performed by a particular DSP subsystem in the communications adapter card of FIG. 2.

FIG. 6 is a table showing the various DSP core clock signal frequencies which are produced by each core clock generator, along with values of an associated counter variable "J," which is used in a computer routine to be discussed in reference to FIG. 8.

Figure 7:
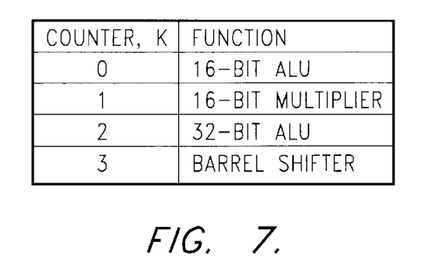
FIG. 7 is a table listing functions of the core kernels of the DSP subsystems in the communications adapter card of FIG. 2.

FIG. 7 is a table showing various DSP functions, along with values of an associated counter variable "K," which is also used in the computer routine to be discussed in reference to FIG. 8.

FIG. 8 is a flow chart showing the operation of a routine 100 to determine the processing speed at which each function of a DSP subsystem 12 should be run to achieve both reliability and optimum speed.

FIG. 9 is a processing speed table showing a maximum process speed at which each of the DSP functions of FIG. 7 can be performed by a particular DSP subsystem 12.

Referring to FIGS. 6–9, after the routine 100 starts in step 102, the value of a counter variable "K" is set to zero in step 104, so that the first function, a 16-bit ALU function, will be selected from the table of FIG. 7. Next, the value of a counter variable "J" is set to zero in step 106. so that the lowest clock speed, 28 Mhz, is selected from the table of FIG. 6 for a subsequent functional test. Next, the routine enters a loop in which the function indicated by the counter variable "K" is tested at increasing levels of processing speed until a failure occurs, or until the function has been successfully tested at all of the processing speeds associated with the clock frequencies of FIG 6.

The first step of this loop occurs in step 108, as the function indicated by counter variable "K" is performed with the clock speed indicated by counter variable "J". If this test is successful, as indicated in step 110, a determination is made in step 112 of whether the testing for the particular function indicated by counter variable "J" has been completed. If this testing has not been completed, as indicated by the counter variable "J" not having reached its highest value (in this example, 3), the counter variable "J" is incremented in step 114, and the functional test is repeated at the next higher processing speed in step 108. On the other hand, if a determination is made in step 112 that the highest processing speed has been used, the values of "J" and "K" are stored, in step 116, within a processing speed table being established for the particular DSP subsystem 12 being tested. This means that subsequently the process speed indicated by counter value "J" will be used to perform the task indicated by counter value "K." Next, a determination is made, in step 118, of whether each function has been tested. If each function has been tested, the routine ends in step 120. If each function has not been tested, the value of "K" is incremented in step 122, and the process of testing the next function is begun with setting the counter variable "J" to zero in step 106.

Returning to step 110, if it is determined that the functional test has failed, a determination is made in step 124 of whether the failure has occurred at the lowest speed of 28 Mhz. Such a failure, which indicates that the function "K" cannot be reliably performed by the particular DSP subsystem 12 being tested at any speed, is not expected to occur, and its occurrence may be indicated as a component failure to the operator. If the failure determined in step 110 is determined to have occurred at a faster processing speed, the value of "J" is decremented in step 126. In either case, the resulting value of "J" is stored in step 116 in a position within the processing speed table corresponding to the value of "K." Step 126 assures the implementation of a safety margin, moving to a lower speed from a speed at which a failure has occurred. Thus, the execution of routine 100 builds a processing speed table indicating the process speeds at which various functions should be performed within a particular DSP subsystem 12.

The POST (Power On Self Test) routines of a conventional computing system include a number of functional tests which are performed each time the computing system is turned on. When hardware is added, removed, or changed, a reconfiguration routine adds subroutines as required to the POST routines, so that the new or different hardware is tested as required. In accordance with a version of the present invention, the testing process described relative to FIGS. 6–8 is handled in this way, with the testing routine 100 being performed for each of the DSP subsystems 12. In this version, the processing speed table for each DSP complex 12 is preferably built within the data store 68 of the DSP complex, as the routine 100 is executed within the DSP complex.

In accordance with another version of the present invention, the testing routine 100 is performed during a reconfiguration routine occurring, for example, when the communications controller card 10 (shown in FIG. 2) is added to the computing system, or during a first configuration routine occurring when the computing system is built. In such a case, the results of each testing routine 100 (for each DSP subsystem 12) are stored in non-volatile storage with other configuration data. (In this context, non-volatile storage is meant to denote storage which is not erased or otherwise reset when power to a computing system is turned off and on). For example, such configuration data is conventionally written in a predetermined portion of the hard drive of a computing system, being read to a portion of the system RAM memory during power on sequencing. With this version of the present invention, the processing speed table for each DSP subsystem 12 is preferably sent over the PCI system bus 3 to the controller 4 (both shown in FIG. 1) and then over the card PCI bus 48 to the individual DSP subsystem 12 for storage within the data store 68 (all shown in FIG. 5) thereof.

Referring to FIGS. 4 and 5, during the operation of the communications adapter 12, the DSP subsystems 12 individually execute various routines, which are individually invoked by the controller processor 53a. The kernel of each DSP subsystem 12 has access to a table of tasks, which is stored, for example in the data store 68 of the particular subsystem 12. This task table includes the possible tasks, and, associated therewith, the various functions (as listed in FIG. 5) which are used by each task. This list of functions, is developed and stored as code for the task is written or otherwise generated. At the beginning of each individual task, each DSP complex 12 checks the functions listed for the task against its processing speed table, and sets its processing speed to match the slowest value in the processing speed table of the variable "J" corresponding to a function required by the task.

While the present invention is particularly described in relation to controlling the processing speeds of DSPs in a communications adapter configuration, it is understood that the processing speed controlling method described herein can be applied to a number of other applications, including the control of the possessing speed of a system processor, without departing from the spirit and scope of the invention.

While the invention has been described in its preferred form or embodiment with some degree of particularity, it is understood that this description has been given only byway of example and that numerous changes in the details of construction, fabrication and use, including the combination and arrangement of parts, may be made without departing from the spirit and scope of the invention.

What is claimed is:

1. A method for controlling the processing rate of a processor within a computing device, wherein said method comprises steps of:

a) executing a test sequence to determine, for each function which can be performed by said processor, a maximum processing speed, within a plurality of processing speeds at which said processor can be operated, at which said function can be reliably performed by said processor, and writing said maximum processing speed within a processing speed table, wherein said test sequence includes operating various of said functions at various of said processing speeds by said processor to determine reliability of operation;

b) determining for a task scheduled to be performed by said processor, the functions to be performed by said processor, and by comparison to said processing speed table, a maximum operating speed at which all said functions to be performed during said task may be performed reliably thereby;

c) performing said task at said maximum operating speed; and d) returning to step b) when another task is scheduled to be performed by said processor; and wherein step a) includes steps of:

e) resetting a first counter, with said first counter indicating a function which can be performed by said processor;

f) resetting a second counter, with said second counter indicating a processing speed within said plurality thereof;

g) operating said processor to perform a function indicated by said first counter at a processing speed indicated by said second counter;

h) determining if a failure has occurred during operation of said processor in step g);

i) if a failure has not occurred, as determined in step h), determining if a maximum value of said second counter has been reached;

j) if a maximum value of said second counter has not been reached, as determined in step l), incrementing said second counter and returning to step g)

k) if a maximum value of said second counter has been reached, as determined in step l), writing said maximum value in said processing speed table in a location corresponding to a function indicated by said first counter, and determining if a maximum value of said first counter has been reached;

l) if a maximum value of said first counter has been reached, as determined in step k), ending step a)

m) if a maximum value of said first counter has not been reached, as determined in step k) incrementing said first counter and returning to step f);

n) if a failure has occurred, as determined in step h) decrementing said second counter, writing a value of said second counter in said processing speed table in a location corresponding to said function indicated by said first counter and determining if said first counter has reached a maximum value;

o) if a maximum value of said first counter has been reached, as determined in step n), ending step a); and p) if a maximum value of said first counter has not been reached, as determined in step n) incrementing said first counter and returning to step f).

2. The method of claim 1, wherein, step h) is followed by:

q) if a failure has occurred, as determined in step h), determining if said second counter is at its initial level;

r) if said counter is at its initial level, as determined in step q, writing said initial level in said processing speed table in a location corresponding to a function indicated by said first counter, and determining if said first counter has reached a maximum value;

s) if a maximum value of said first counter has been reached, as determined in step r), ending step a);

t) if a maximum value of said first counter has not been reached, as determined in step k) incrementing said first counter and returning to step f).

3. The method of claim 1, wherein step a) occurs during a power on sequence of said computing device.

4. The method of claim 1, wherein, within step b), said maximum operating speed is determined to be a lowest maximum operating speed at which all said functions to be performed during said task can be performed reliably by said processor.

5. A computing system comprising:

a connector for attachment of a network transmission line;

a plurality of digital signal processors arranged to process data received from said network transmission line and to process data for transmission along said network transmission line;

a peripheral clock signal circuit generating signals used within said digital signal processors to time peripheral functions thereof with the transmission of interrupts, wherein said peripheral clock circuit is driven in response to signals received from said network transmission line;

a memory storing a processing speed table for each digital signal processor within said plurality thereof, with said processing speed table having a plurality of indices representing maximum processing speeds at which said digital signal processor can reliably perform a plurality of functions, with each index within said plurality thereof being associated in said processing speed table with a function within said plurality thereof;

means for determining, for a task to be performed by said digital signal processor, which functions, within said plurality thereof, are required; and a core clock signal circuit for each digital signal processor within said plurality thereof generating a signal timing operation of a core kernel of said digital signal processor, wherein said core clock signal circuit operates at a maximum reliable operating speed determined from said functions which are required for said task to be performed and said process speed table for said digital signal processor.

6. The computing system of claim 5, additionally comprising processing means for performing a test sequence, for each digital signal processor within said plurality thereof, to determine, for each function which can be performed by said digital signal processor, a maximum processing speed, within a plurality of processing speeds at which said digital signal processor can be operated, at which said function can be reliably performed by said processor, and writing said maximum processing speed within said processing speed table.

7. The computing system of claim 6, wherein said test sequence is performed during a power on sequence of said computing system.

8. The computing system of claim 6, wherein said test sequence is performed during a configuration sequence of said computing system, with said processing speed table for each digital processing system within said plurality thereof being stored in non-volatile storage.

* * * * *